United States Patent
Mikhemar et al.

(10) Patent No.: US 9,749,119 B2
(45) Date of Patent: Aug. 29, 2017

(54) RF FRONT-END WITH WIDEBAND TRANSMITTER/RECEIVER ISOLATION

(71) Applicant: Avago Technologies General IP (Singapore) Pte. Ltd., Singapore (SG)

(72) Inventors: Mohyee Mikhemar, Irvine, CA (US); Hooman Darabi, Laguna Niguel, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 14/546,746

(22) Filed: Nov. 18, 2014

(65) Prior Publication Data

US 2015/0071132 A1     Mar. 12, 2015

Related U.S. Application Data

(63) Continuation of application No. 12/567,100, filed on Sep. 25, 2009, now Pat. No. 8,897,722.

(Continued)

(51) Int. Cl.
| | |
|---|---|
| *H04L 5/14* | (2006.01) |
| *H04B 1/525* | (2015.01) |
| *H04B 1/04* | (2006.01) |

(52) U.S. Cl.
CPC ............. *H04L 5/143* (2013.01); *H04B 1/04* (2013.01); *H04B 1/525* (2013.01); *H04B 2001/0416* (2013.01)

(58) Field of Classification Search
CPC ........... H04L 5/143; H04B 1/04; H04B 1/525; H04B 2001/0416
See application file for complete search history.

(56) References Cited

U.S. PATENT DOCUMENTS

| | | |
|---|---|---|
| 3,047,821 A | 7/1962 | Hilbinger |
| 3,340,463 A | 9/1967 | Oka |

(Continued)

OTHER PUBLICATIONS

Satori, Eugene F., "Hybrid Transformers," IEEE Transactions on Parts, Materials and Packaging, vol. PMP-4, No. 3, Sep. 1968, pp. 59-66.

(Continued)

*Primary Examiner* — Hassan Kizou
*Assistant Examiner* — Abdullahi Ahmed
(74) *Attorney, Agent, or Firm* — Sterne, Kessler, Goldstein & Fox P.L.L.C.

(57) ABSTRACT

Embodiments of a four-port isolation module are presented herein. In an embodiment, the isolation module includes a step-up autotransformer comprising a first and second winding that are electrically coupled in series at a center node. The first port of the isolation module is configured to couple an antenna to a first end node of the series coupled windings. The second port of the isolation module is configured to couple a balancing network to a second end node of the series coupled windings. The third port is configured to couple a transmit path to the center node. The fourth port is configured to couple a differential receive path across the first end node and the second end node. The isolation module effectively isolates the third port from the fourth port to prevent strong outbound signals received at the third port from saturating an LNA coupled to the fourth port.

20 Claims, 6 Drawing Sheets

(Isolation by Frequency Selection - Conventional)

Related U.S. Application Data (60) Provisional application No. 61/241,802, filed on Sep. 11, 2009.

(56) References Cited

U.S. PATENT DOCUMENTS

| | | | |
|---|---|---|---|
| 3,973,088 A | 8/1976 | Ota et al. | |
| 4,051,475 A | 9/1977 | Campbell | |
| 4,278,980 A | 7/1981 | Ogita et al. | |
| 4,446,395 A | 5/1984 | Hadjicostis | |
| 4,616,188 A | 10/1986 | Stitt et al. | |
| 6,026,286 A | 2/2000 | Long | |
| 6,144,259 A * | 11/2000 | Kirisawa | H03F 1/301 330/296 |
| 6,339,265 B1 * | 1/2002 | Levin | H02J 3/01 307/105 |
| 6,480,553 B1 | 11/2002 | Ho et al. | |
| 6,577,212 B1 | 6/2003 | Mattisson et al. | |
| 6,721,544 B1 | 4/2004 | Franca-Neto | |
| 6,735,424 B1 * | 5/2004 | Larson | H03F 1/0272 330/136 |
| 7,042,208 B1 | 5/2006 | Harris | |
| 7,065,327 B1 | 6/2006 | Macnally et al. | |
| 7,167,688 B2 | 1/2007 | Li et al. | |
| 7,460,662 B2 | 12/2008 | Pagnanelli | |
| 7,489,914 B2 | 2/2009 | Govind et al. | |
| 7,515,879 B2 | 4/2009 | Okabe et al. | |
| 7,801,493 B2 * | 9/2010 | Do | H04B 1/44 343/700 R |
| 7,839,938 B2 | 11/2010 | Hershbarger | |
| 7,844,231 B2 | 11/2010 | Yoon | |
| 8,130,054 B1 | 3/2012 | Martin et al. | |
| 8,208,865 B2 | 6/2012 | Mikhemar et al. | |
| 8,208,866 B2 | 6/2012 | Mikhemar et al. | |
| 8,232,857 B1 | 7/2012 | Wright et al. | |
| 8,249,536 B2 | 8/2012 | Jung et al. | |
| 8,867,999 B2 * | 10/2014 | Agrawal | H04W 72/082 455/296 |
| 2002/0177417 A1 | 11/2002 | Visser | |
| 2003/0095421 A1 | 5/2003 | Kadatskyy et al. | |
| 2004/0092285 A1 | 5/2004 | Kodim | |
| 2004/0095277 A1 | 5/2004 | Mohamadi | |
| 2004/0145411 A1 | 7/2004 | Harvey | |
| 2007/0117524 A1 | 5/2007 | Do | |
| 2007/0152904 A1 | 7/2007 | Castaneda et al. | |
| 2007/0207747 A1 | 9/2007 | Johnson et al. | |
| 2008/0139149 A1 | 6/2008 | Mu et al. | |
| 2010/0157858 A1 | 6/2010 | Lee et al. | |
| 2010/0210223 A1 | 8/2010 | Gorbachov | |
| 2011/0064004 A1 | 3/2011 | Mikhemar et al. | |
| 2011/0064005 A1 | 3/2011 | Mikhemar et al. | |
| 2011/0158134 A1 | 6/2011 | Mikhemar et al. | |
| 2011/0158135 A1 | 6/2011 | Mikhemar et al. | |
| 2013/0285764 A1 | 10/2013 | Mikhemar et al. | |

OTHER PUBLICATIONS

Mikhemar, M., Darabi, H. and Abidi, A., "A Tunable Integrated Duplexer with 50dB Isolation in 40nm CMOS," 2009 IEEE International Solid-State Circuits Conference, Session 22, PA and Antenna Interface 22.7, Feb. 11, 2009, 3 pages.

European Search Report for EP Patent Application No. EP10009280.8, European Patent Office, The Hague, Netherlands, mailed on Feb. 25, 2013.

* cited by examiner

FIG. 1 (Isolation by Frequency Selection - Conventional)

FIG. 2 (Wideband Isolation by Electrical Balance)

FIG. 3 (Wideband Isolation by Electrical Balance)

FIG. 4 (Wideband Isolation by Electrical Balance - Transmission)

FIG. 5 (Wideband Isolation by Electrical Balance - Reception)

FIG. 6 (Noise Matched LNA)

RF FRONT-END WITH WIDEBAND TRANSMITTER/RECEIVER ISOLATION

CROSS REFERENCE TO RELATED APPLICATIONS

This patent application is a continuation of U.S. patent application Ser. No. 12/567,100, filed Sep. 25, 2009, which claims the benefit of U.S. Provisional Patent Application No. 61/241,802, filed Sep. 11, 2009, all of which are incorporated herein by reference.

FIELD OF THE INVENTION

This application relates generally to wireless communication systems, and more particularly to full-duplex radio frequency (RF) transceivers that operate in such systems.

BACKGROUND

A duplex communication system includes two interconnected transceivers that communicate with each other in both directions. There are two specific types of duplex communication systems; namely, half-duplex communication systems and full-duplex communication systems. In a half-duplex communication system, the two interconnected transceivers communicate with each other in both directions. However, the communication in a half-duplex system is limited to one direction at a time; that is, only one of the two interconnected transceivers transmits at any given point in time, while the other receives. A full-duplex communication system, on the other hand, does not have such a limitation. Rather, in a full-duplex communication system, the two interconnected transceivers can communicate with each other simultaneously in both directions.

Wireless and/or mobile communication systems are often full-duplex as specified by the standard(s) that they employ. For example, a common full duplex mobile communication standard includes Universal Mobile Telecommunications System (UMTS). In these full-duplex communication systems, the transmitter typically uses one carrier frequency in a given frequency band (e.g., 900 MHz, 1800 MHz, 1900 MHz, 2100 MHz, etc.) and the receiver uses a different carrier frequency in the same frequency band. This scheme, where the transmitter and receiver operate over different frequencies, is referred to as frequency division duplexing (FDD).

Despite using different frequencies, the signal strength of the transmitted signal is often significantly greater than that of the received signal (e.g., by as much as 130 dB) at the transceiver. As such, the receiver is susceptible to interference from the transmitted signal. In order to limit the interference, conventional transceivers include a duplexer, which utilizes frequency selectivity to provide 50-60 dB of isolation between the transmitter and receiver. However, to provide for today's high frequency communication standards, duplexers should be built with high quality factor (Q-factor) and low loss materials, which currently cannot be done using silicon-based technology. As such, duplexers are fabricated using special materials and processes (e.g., ceramic, surface acoustic wave (SAW), film bulk acoustic wave (FBAR), etc.) that cannot be integrated with a transceiver on a silicon-based IC.

More recent implementations of full-duplex wireless transceivers operate over multiple frequency bands (e.g., there are 14 frequency bands for FDD-UMTS), which require a separate duplexer for each band in order to meet the isolation requirement. As each duplexer is off-chip (i.e., not integrated with the transceiver on the silicon based IC), the cost in terms of monetary and size for multi-band transceivers is substantial.

Therefore, a need exists for a duplexer functional circuit that can be fabricated using silicon-based technology such that it can be implemented on the same integrated circuit as the transceiver and that can serve multiple frequency bands if desired.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may he practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment." "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

1. Isolation by Frequency Selection

Figure 1:
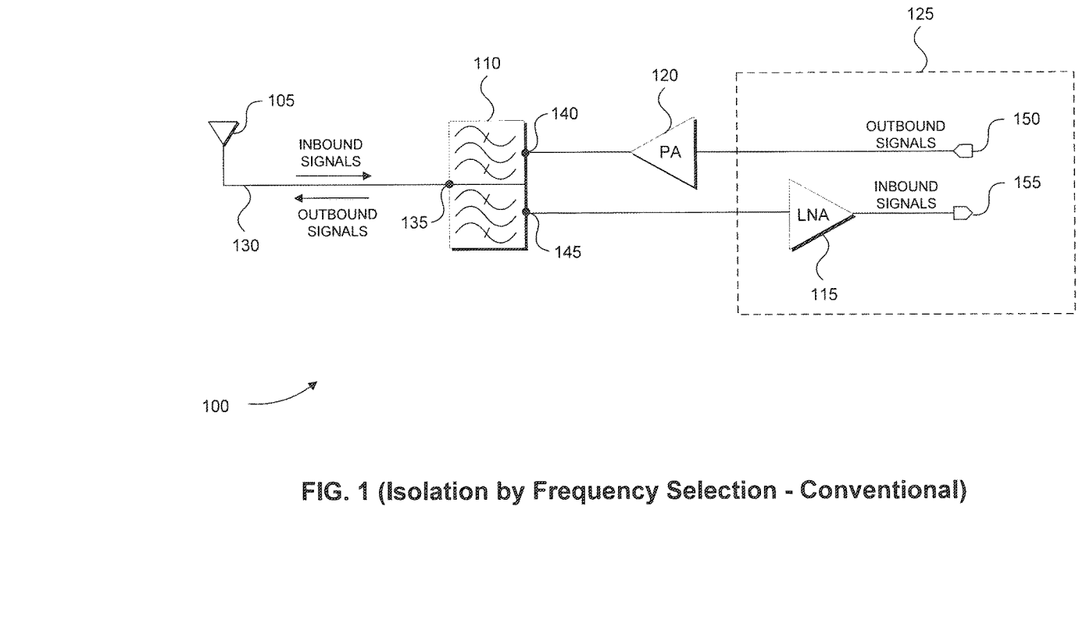
FIG. 1 illustrates a block diagram of an RF front-end that provides isolation by frequency selection.

FIG. 1 illustrates a block diagram of an RF front-end 100 configured to provide full-duplex communication. RF front-end 100 includes an antenna 105, a duplexer 110, a low-noise amplifier (LNA) 115, a power amplifier (PA) 120, and an integrated-circuit (IC) 125. RF front-end 100 can be used within a cellular telephone, a laptop computer, a wireless local area network (WLAN) station, and/or any other device that transmits and receives RF signals.

In operation, RF front-end 100 transmits and receives RF signals over non-overlapping portions of a particular frequency band (e.g., one of the 14 bands specified by FDI-UMTS, including the 900 MHz, 1800 MHz, and 2100 MHz bands). By transmitting and receiving signals over non-overlapping portions of a particular frequency band, the two signals do not interfere with each other and full-duplex communication can be achieved. For example, as illustrated in FIG. 1, both inbound and outbound signals are simultaneously coupled between antenna 105 and duplexer 110 over a common signal path 130. In such an arrangement, duplexer 110 is used to couple common signal path 130 to both the input of LNA 115 and to the output of PA 120. Duplexer 110 provides the necessary coupling, while preventing strong outbound signals, produced by PA 120, from being coupled to the input of LNA 115.

As illustrated in FIG. 1, duplexer 110 is a three-port device having an antenna port 135, a transmit port 140, and a receive port 145. Antenna port 135 is coupled to transmit port 140 through a transmit band-pass filter, included in duplexer 110, and to receive port 145 through a receive band-pass filter, further included in duplexer 110. The pass band of the transmit filter is centered within the frequency range of the outbound signals, which are received at node 150 from a transmitter (not shown). The pass band of the receive filter is centered within the frequency range of the inbound signals, which are passed to a receiver (not shown) at node 155. The transmit and receive band-pass filters are configured such that their respective stop bands overlap with each others pass bands. In this way, the band-pass filters isolate the input of LNA 115 from the strong outbound signals produced by PA 120. In typical implementations, duplexer 110 must attenuate the strong outbound signals by about 50-60 dB to prevent the outbound signals from saturating LNA 115.

Today's high frequency communication standards (e.g., FDD-UMTS) dictate that frequency selective duplexers, such as duplexer 110, be built with very high Q-factor and low loss materials, which currently cannot be done using silicon-based technology. As such, duplexers are fabricated using special materials and processes (e.g., ceramic, surface acoustic wave (SAW), film bulk acoustic wave (FBAR), etc.) that cannot be integrated with a transceiver on a silicon-based IC. In an embodiment, IC 125 is implemented using silicon-based technology and includes at least portions of LNA 115, the transmitter (not shown) coupled at node 150, and the receiver (not shown) coupled at node 155. Because conventional duplexer 110 typically cannot be integrated on IC 125, due to the limitations of silicon-based technology, duplexer 110 is provided for off-chip, thereby increasing the size and cost of the radio transceiver.

In addition, more recent implementations of full-duplex radio transceivers operate over multiple frequency bands (e.g., there are 14 frequency bands for FDD-UMTS), which require a separate conventional duplexer 110 for each band. In these multi-band transceivers, each duplexer is off-chip, significantly increasing the size and cost of the radio transceiver.

Therefore, a need exists for a duplexer functional circuit that can be fabricated using silicon-based technology such that it can be implemented on the same integrated circuit as the radio transceiver.

2. Isolation by Electrical Balance

Figure 2:
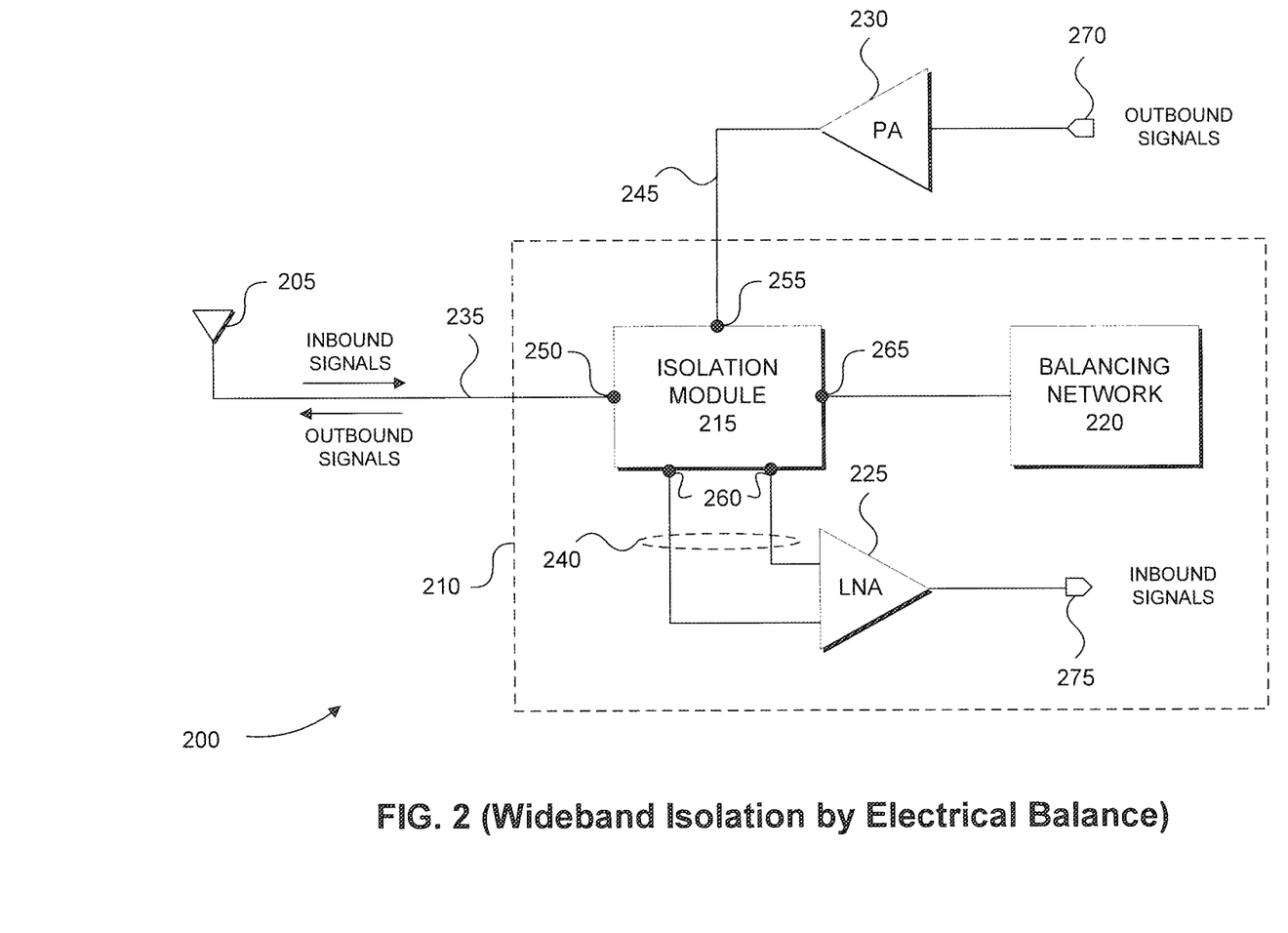
FIG. 2 illustrates a block diagram of an RF front-end that provides isolation by electrical balance, according to embodiments of the present invention.

FIG. 2 illustrates a block diagram of an RF front-end 200 configured to provide full-duplex communication, according to embodiments of the present invention. Unlike RF front-end 100, illustrated in FIG. 1, which provides isolation using frequency selection, RF front-end 200 provides wideband isolation using electrical balance. RF front-end 200 includes an antenna 205, an IC 210, an isolation module 215, a balancing network 220, an LNA 225, and a PA 230. RF front-end 200 can be used within a cellular telephone, a laptop computer, a wireless local area network (WLAN) station, and/or any other device that transmits and receives RF signals.

In operation, RF front-end 200 transmits and receives RF signals over non-overlapping portions of at least one particular frequency band (e.g., one of the 14 bands specified by FDD-UMTS, including the 900 MHz, 1800 MHz, and 2100 MHz bands). By transmitting and receiving signals over non-overlapping portions of a particular frequency band, the two signals do not interfere with each other and full-duplex communication can be achieved. For example, as illustrated in FIG. 2, both inbound and outbound signals are simultaneously coupled between antenna 205 and isolation module 215 over a common signal path 235. In such an arrangement, isolation module 215 is used to couple common signal path 235 to a differential input 240 of LNA 225 and to an output 245 of PA 230. Isolation module 215 provides the necessary coupling, while preventing strong outbound signals that are provided by PA 230, from saturating LNA 225.

Isolation module 215 is specifically implemented as a four-port device having an antenna port 250, a transmit port 255, a differential receive port 260, and a balance port 265. Isolation module 215, in conjunction with balancing network 220, is configured to isolate transmit port 255 from differential receive port 260 by electrical balance. Specifically, and as will be explained further below in regard to FIG. 3, the energy of the strong outbound signals, provided by PA 230 at transmit port 255. is split by isolation module 215, with a first portion of the energy directed towards antenna 205 for transmission, and a second portion of the energy directed towards balancing network 220, where it is dissipated (as heat). In the ideal situation, balancing network 220 is configured to provide an impedance substantially equal to that of antenna 205 such that the first portion and second portion of energy are equal (i.e., each are exactly one-half the energy of the strong outbound signals). In this way, as will be described further below, isolation module 215 can effectively isolate differential input 240 of LNA 225 from the strong outbound signals.

In an embodiment, IC 210 is implemented using silicon-based technology and can include at least portions of LNA 225, balancing network 220, the transmitter (not shown) coupled to node 270, and the receiver (not shown) coupled to node 275. In addition, unlike duplexer 110 illustrated in FIG. 1, isolation module 215 can be further integrated within IC 210 because isolation by electrical balance does not require high Q-factor components necessary for isolation by frequency selectivity. Moreover, because the method of isolation provided by isolation module 215 (i.e., electrical balance) is, in general, frequency independent, a single isolation module can be used in a multi-band application that requires full-duplex communication over several frequency bands (e.g., two or more of the 14 bands specified by FDD-UMTS). Stated another way, a single isolation module can be used to provide isolation for multiple different applications that operate over different frequency bands.

Figure 3:
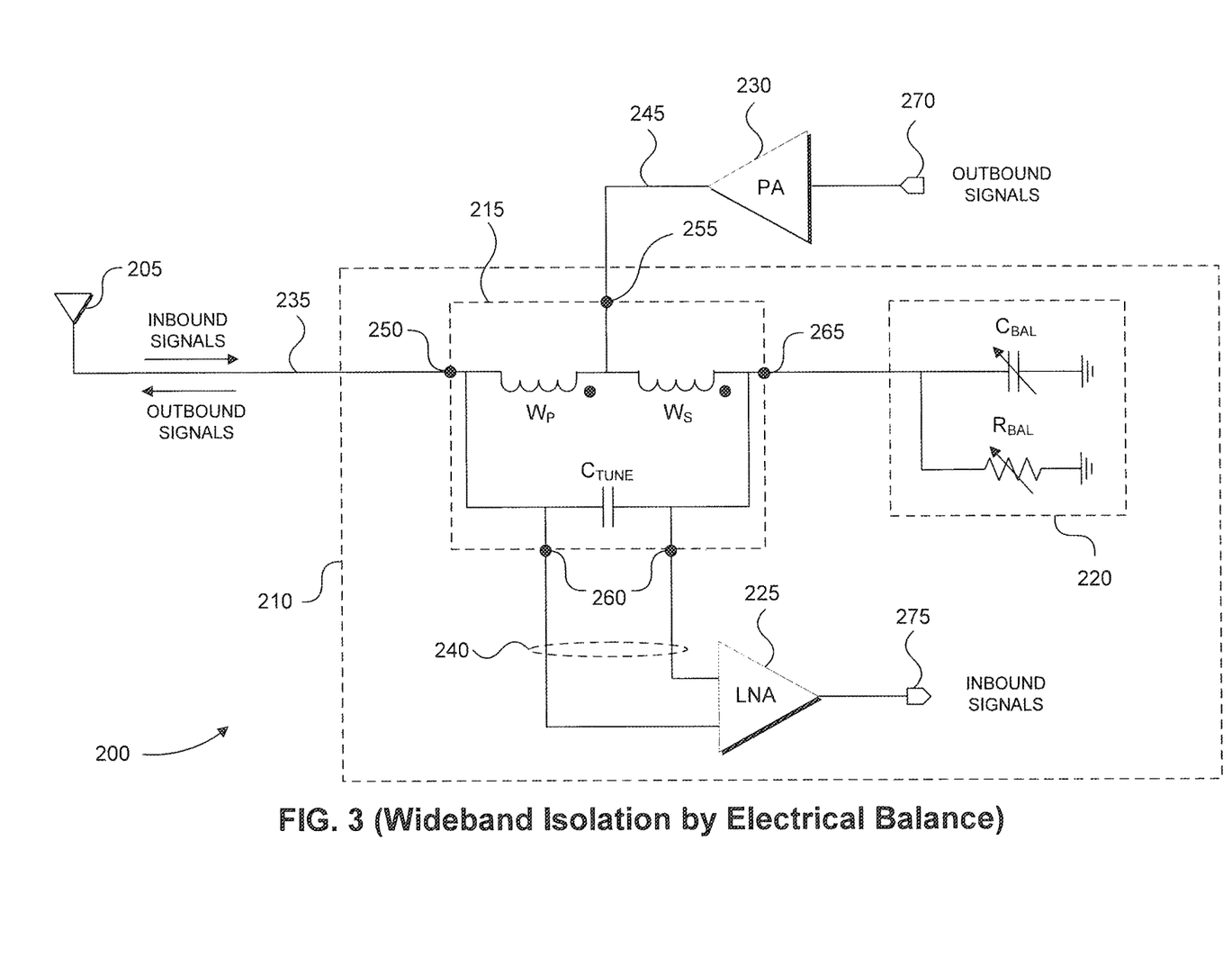
FIG. 3 illustrates a schematic block diagram of the RF front-end, illustrated in FIG. 2, that provides isolation by electrical balance, according to embodiments of the present invention.

FIG. 3 illustrates a schematic block diagram of RF front-end 200, according to embodiments of the present invention. As illustrated in FIG. 3, balance network 220 includes a tunable capacitor $C_{BAL}$ and a tunable resistor $R_{BAL}$. These two tunable components can be adjusted such that balance network 220 provides a substantially similar impedance as antenna 205 and, in effect, electrically balances isolation module 215 with antenna 205.

Isolation module 215, as illustrated in FIG. 3, includes a tuning capacitor $C_{TUNE}$ and an autotransformer constructed from two series coupled windings: primary winding $W_P$ and secondary winding $W_S$. As indicated by the positioning of the polarity marker for each winding, the autotransformer is a step-up autotransformer with additive polarity. In an embodiment, isolation module 215 can provide greater than 50 dB of isolation between transmit port 255 and differential receive port 260 over a bandwidth of several hundred MHz (e.g., 100-200 MHz).

Figure 4:
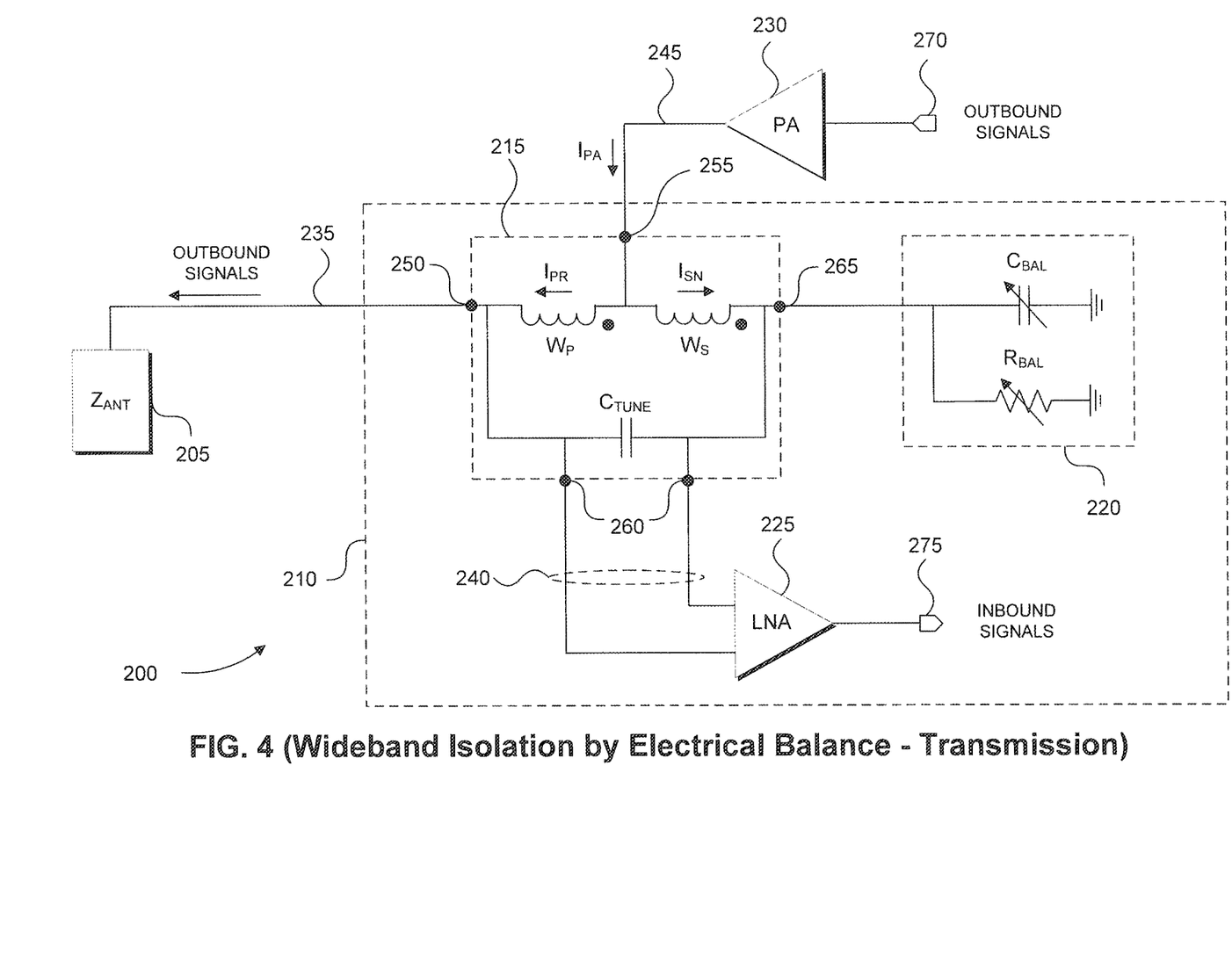
FIG. 4 illustrates a schematic block diagram of the RF front-end, illustrated in FIG. 3, with the antenna replaced by its effective impedance, according to embodiments of the present invention.

Referring now to FIG. 4. To illustrate how isolation module 215 isolates differential input 240 of LNA 225 from a strong outbound signal produced by PA 230, superposition will be used. As illustrated in FIG. 4, antenna 205 has been replaced by its equivalent impedance $Z_{ANT}$. In operation, isolation module 215 receives at transmit port 255 a strong outbound signal produced by PA 230. The strong outbound signal is coupled to a center node of the series coupled windings $W_P$ and $W_S$ and has an associated current $I_{PA}$ as illustrated in FIG. 4. Assuming that the impedance of balance network 220 substantially equals the impedance of antenna 205 ($Z_{ANT}$), and the voltage across windings $W_P$ and $W_S$ are equal (because of equal turns ratio, $N_P=N_S$), the current $I_{PA}$ splits evenly between primary winding $W_P$ and secondary winding $W_S$; that is, the two currents $I_{PR}$ and $I_{SN}$, illustrated in FIG. 4, are equal in magnitude.

Because differential input 240 of LNA 225 presents a high impedance, the entire current $I_{PR}$ substantially couples to antenna 205 through antenna port 250 and the entire current $I_{SN}$ substantially couples to balance network 220 through balance port 265. Because antenna 205 and balance network 220 have substantially equal impedances, the voltage produced across each is also substantially equal. These two voltage signals, across antenna 205 and balance network 220, are each coupled to different ends of differential input 240 of LNA 225. Thus, because the two voltage signals are equal in magnitude, they appear common mode to LNA 225, thereby isolating LNA 225 from the strong outbound signal produced by PA 230. In other words, differential receive port 260 is effectively isolated from transmit port 255.

In this implementation, half of the signal energy produced by PA 230 is available for transmit by antenna 205 and half is dissipated or wasted by balance network 220. As a result, the strong outbound signals provided by PA 230 suffer a dissipation loss of around 3.0 dB (or half). In an embodiment, the turns ratio of the two windings $W_P$ and $W_S$ can be skewed away from a value of 1 such that more of the signal energy produced by PA 230 is provided to antenna 205 than to balance network 220. For example, assuming the primary winding $W_P$ has $N_P$ turns and the secondary winding $W_S$ has $N_S$ turns, their turns ratio is given by $N_P/N_S$. In the nominal instance, $N_P/N_S$ is equal to 1 and the strong outbound signals provided by PA 230 suffer a dissipation loss of around 3.0 dB. Skewing the number of turns of the secondary winding $W_S$ by a factor of α (or alternatively the number of turns of the primary winding $W_P$ by a factor of 1/α), provides α times more current through the primary winding $W_P$ than the secondary winding $W_S$ (assuming α>1) and thus more power to antenna 205. To maintain isolation between transmit port 255 and differential receive port 260, balance network 220 can be adjusted to compensate for the increase in current to antenna 205. For example, the resistive portion of the impedance provided by balance network 220 can be set equal to α times the resistive portion of the impedance provided by antenna 205.

It should be noted, however, that skewing the turns ratio of the autotransformer effectively increases the insertion loss of isolation module 215 for inbound signals received by antenna 205. In an embodiment, the turns ratio of the autotransformer can be skewed to provide a maximal signal to antenna 205, while maintaining a maximum acceptable insertion loss between antenna port 250 and differential receive port 260.

Figure 5:
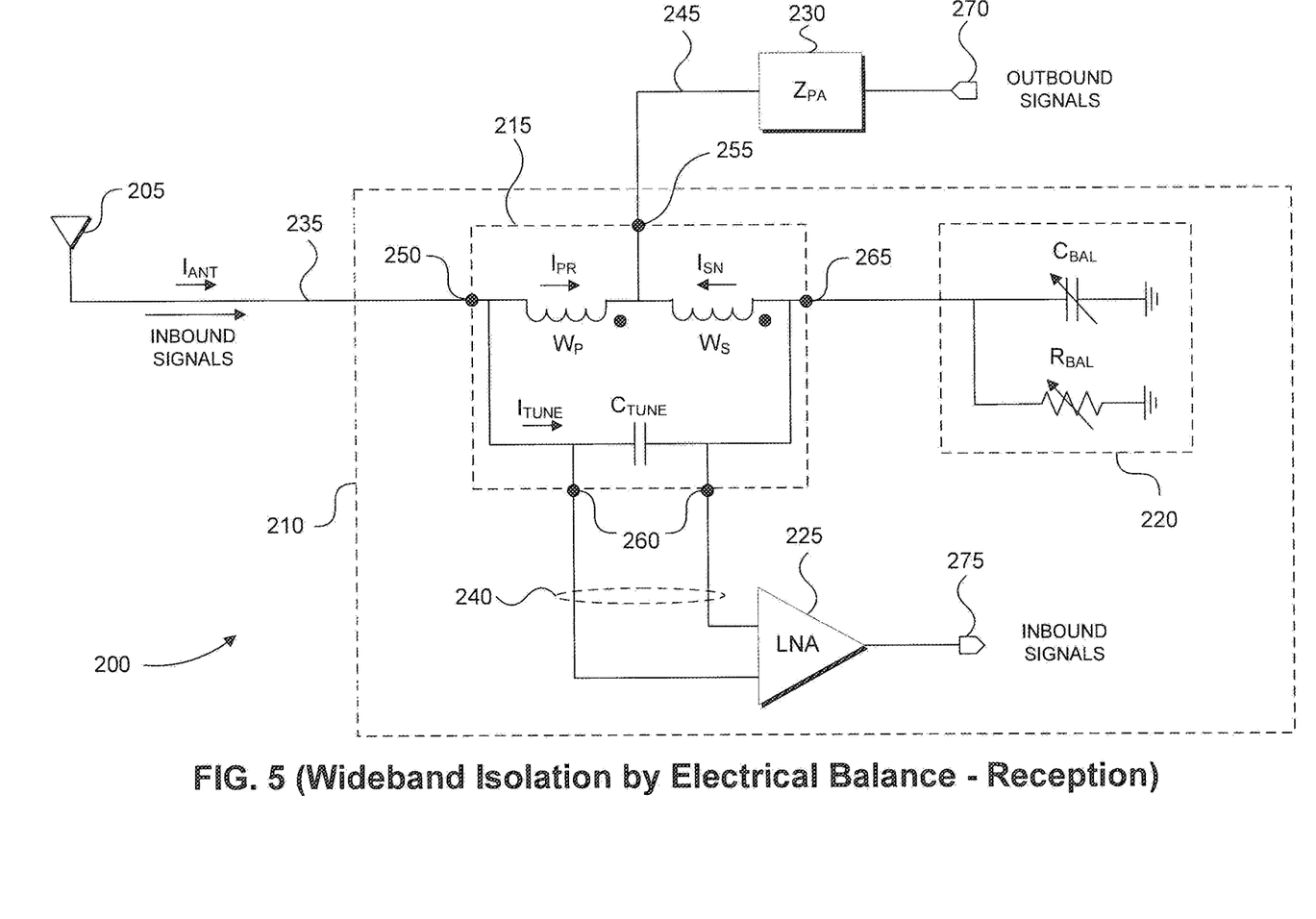
FIG. 5 illustrates a schematic block diagram of the RF front-end, illustrated in FIG. 3, with the power amplifier replaced by its effective impedance, according to embodiments of the present invention.

Referring now to FIG. 5. Superposition is used to illustrate the reception of an inbound signal and the isolation provided by isolation module 215 between antenna port 250 and balance port 265. As illustrated in FIG. 5, PA 230 has been replaced by its equivalent impedance $Z_{PA}$. In operation, isolation module 215 receives at antenna port 250 a weak inbound signal from antenna 205. The weak inbound signal is coupled to a first end of primary winding $W_P$, to a first end of differential input 240, and to a first end of tuning capacitor $C_{TUNE}$. A current $I_{ANT}$ is produced by antenna 205 and coupled to antenna port 250 of isolation module 215. A first portion $I_{PR}$ of the current $I_{ANT}$ flows through primary winding $W_P$ and a second portion $I_{TUNE}$ of the current $I_{ANT}$ flows through tuning capacitor $C_{TUNE}$. Assuming that the voltages across windings $W_P$ and $W_S$ are equal (because of equal turns ratio, $N_P=N_S$), the current $I_{SN}$ flowing through secondary winding $W_S$ will be equal in magnitude to $I_{PR}$. A differential voltage is produced across the receive port 260 and LNA 225 senses the weak inbound signal.

The noise figure of isolation module 215 has two main contributors:

the effective resistance of antenna 205 and the effective resistance of balance network 220. If Ns/Np=α and isolation module 215 is skewed to favor power amplifier 230 with lower loss so that α>1, then the effective resistance of antenna 205 is made to be α times greater than the effective resistance of balance network 220. In this instance, the noise figure of isolation module 215 is given by $10*\log(\alpha+1)$. From this, it is clear that the noise figure of isolation module 215 does not depend on the input impedance of LNA 225.

The insertion loss, however, does depend on the input impedance of LNA 225. Therefore, and as will be explained further below in regard to FIG. 6, LNA 225 can be implemented as a noise-matched LNA to provide a high-input impedance that maximizes the voltage gain from antenna 205 to LNA 225.

3. Noise latched Low Noise Amplifier

In conventional RF front-ends, such as RF-front end 100 illustrated in

FIG. 1, the use of frequency selective isolation requires the use of an off-chip duplexer. The length of the signal path, coupling the duplexer to the on-chip LNA is typically non-negligible compared to the wavelength of the signals. carried over it. Therefore, in conventional RF front-ends, the signal path is treated as a transmission line that is susceptible to the well known property of reflections. To prevent interference from possible reflections (and to maximize power transfer), the output impedance of the duplexer is impedance matched to the input impedance of the LNA. Typically, this is accomplished by impedance matching the respective ports to a common transmission line of 50 Ohms.

In RF front-end 200, illustrated in FIGS. 2-5, isolation is provided via electrical balance on-chip with LNA 225. The novel on-chip isolation solution allows the length of the signal path, coupling isolation module 215 to LNA 225, to be substantially negligible compared to the wavelength of the signals carried over it. In other words, the voltage on the signal path at any given point in time is substantially the same at all points on the signal path. Thus, the requirement of impedance matching is no longer necessary using the on-chip isolation illustrated in FIGS. 2-5. Without the requirement of impedance matching, LNA 225 can be optimized for noise matching. In general, noise matching of LNA 225 is achieved by configuring LNA 225 to have an extremely large input impedance; often as large as possible (as opposed to the 50 Ohms commonly required for impedance matching purposes). Configuring LNA 225 for noise-matching provides for a high-input impedance that maximizes the voltage gain from antenna 205 to LNA 225.

Figure 6:
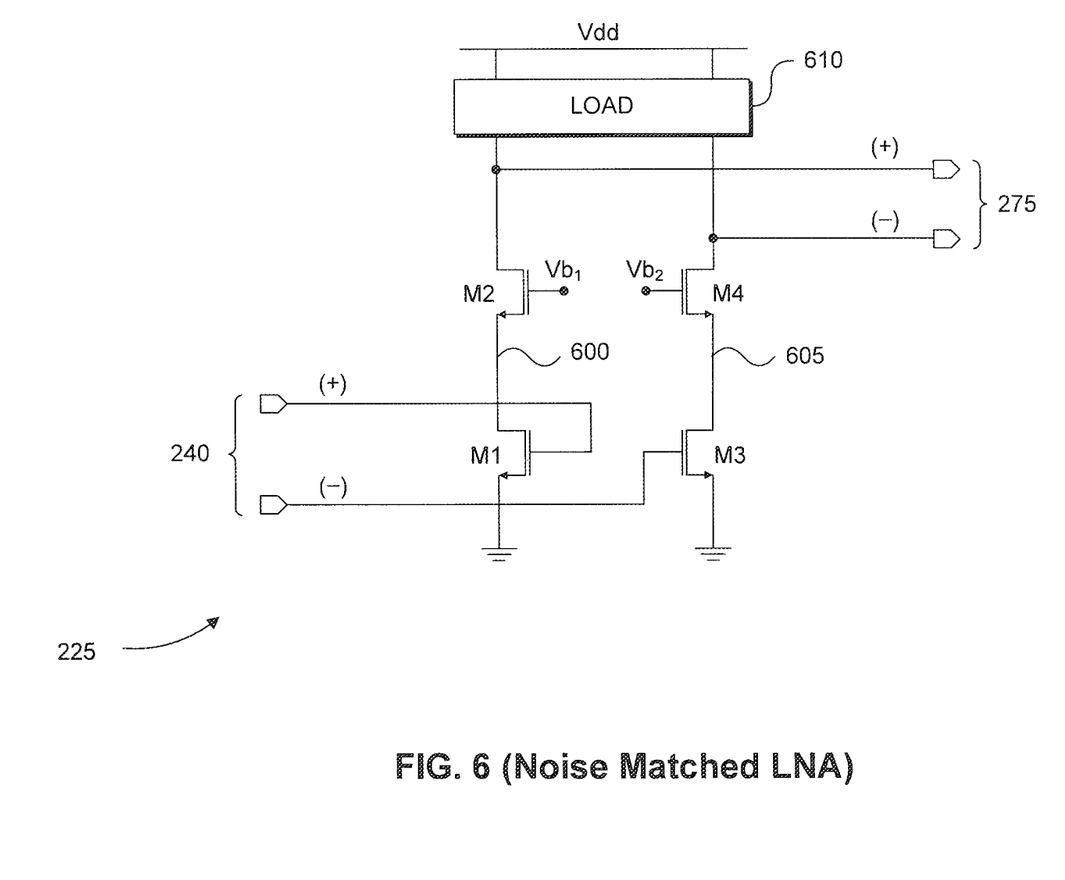
FIG. 6 illustrates a noise matched INA that can be implemented within the RF front-end illustrated in FIGS. 2-5, according to embodiments of the present invention.

FIG. 6 illustrates an exemplary embodiment of LNA 225 that has been noise-matched, according to embodiments of the present invention. As illustrated in FIG. 6, LNA 225 is configured as a common source amplifier. LNA 225 receives inbound signals at differential input 240 and provides an amplified version of the inbound signals at differential output 275. The differential input 240 is coupled to isolation module 215 via a signal path that has a length which is substantially negligible compared to the wavelength of the signals carried over it.

LNA 225 includes a first field effect transistor (FET) M1 coupled at its gate to the positive end of differential input 240. The source of M1 is coupled to ground. The drain of M1 is coupled to the source of a second FET M2 at a node 600 in a cascode configuration. M2 is biased at its gate via bias voltage $Vb_1$. In an embodiment, M2 is used to maximize gain and provide reverse isolation. The drain of M2 is coupled through a load 610 to a supply voltage $V_{DD}$. Load 610 includes any one of a resistor, inductor, capacitor, or any combination thereof. A positive end of differential output 275 is provided at the drain of M2.

LNA 225 further includes a third FET M3 coupled at its gate to the negative end of the differential input 240. The source of M3 is coupled to ground. The drain of M3 is coupled to the source of a fourth FET M4 at a node 605 in a cascode configuration. M4 is biased at its gate via bias voltage $Vb_2$. In an embodiment, M4 is used to maximize gain and provide reverse isolation. The drain of M4 is coupled through a load 610 to a supply voltage $V_{DD}$. Load 610, as noted above, includes any one of a resistor, inductor, capacitor, or any combination thereof. A negative end of a differential output 275 is provided at the drain of M4.

The theoretical input impedance of LNA 225 as illustrated in FIG. 6, ignoring parasitic capacitances, is infinite. In a conventional common source LNA, designed for matching to a particular impedance, a capacitor is typically coupled in series to each gate of FETs M1 and M3 and inductors are coupled between the sources of FETs M1 and M3 and ground (i.e., inductive degeneration). Thus, the noise-matched LNA 225 as illustrated in FIG. 6 not only provides improved noise-matching over an impedance matched LNA, but further eliminates the need for the additional capacitors and inductors commonly used to provide impedance matching.

As noted above, exemplary LNA 225 illustrated in FIG. 6 is provided for the purpose of illustration and not limitation. Other equivalent implementations and/or variations of exemplary LNA 225 are possible as would be understood by a person skilled in the art based on the teachings herein. Equivalent implementations and/or variations may include, for example, variations in transistor type (e.g., PNP, MOSFET, JFET, CMOS, etc.), variations in amplifier configuration (e.g., common-collector, common-base, common-source. common-drain, common-gate, Darlington pair, Cascode, Sziklai pair, etc.), and variations in amplifier input/output configuration (e.g., single-ended, single-input-single-output, single-input-multiple-output, etc.).

4. Conclusion

It is to be appreciated that the Detailed Description section, and not the Summary and Abstract sections, is intended to he used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A radio-frequency (RF) front-end comprising:
   an autotransformer comprising a first end node, a second end node, and a center node, wherein the autotransformer further comprises a primary winding and a secondary winding that are electrically coupled together at the center node;
   an antenna coupled to the first end node;
   a balancing network coupled to the second end node;
   a power amplifier coupled to the center node; and
   a low-noise amplifier coupled across the first end node and the second end node.

2. The RF front-end of claim 1, wherein the autotransfoimer and the balancing network are configured such that a signal provided by the power amplifier at the center node appears common mode to the low noise amplifier at the first end node and the second end node.

3. The RF front-end of claim 1, wherein the RF front-end is configured for full-duplex communication.

4. The RF front-end of claim 1, wherein the autotransformer is a step-up autotransformer.

5. The RF front-end of claim 1, wherein a ratio of a number of turns in the primary winding to a number of turns in the secondary winding is configured to be adjusted.

6. The RF front-end of claim 5, wherein the ratio is configured to be adjusted based on an insertion loss of the autotransformer between the antenna and the low-noise amplifier.

7. The RF front-end of claim 5, wherein an impedance of the balancing network is configured to be adjusted based on the ratio.

8. The RF front-end of claim 1, wherein an impedance of the balancing network is configured to be adjusted based on an impedance of the antenna.

9. The RF front-end of claim 1, wherein the low-noise amplifier is a noise-matched low-noise amplifier.

10. A radio-frequency (RF) front-end comprising:
    an autotransformer comprising a primary winding and a secondary winding, wherein the primary winding and the secondary winding are coupled in series at a center node;
    an antenna coupled to an end node of the primary winding;
    a balancing network coupled to an end node of the secondary winding;
    a power amplifier coupled to the center node; and
    a low-noise amplifier coupled across the end node of the primary winding and the end node of the secondary winding.

11. The RF front-end of claim 10, wherein a resistance of the balancing network is inversely proportional to a ratio of a number of turns of the primary winding to a number of turns of the secondary winding.

12. The RF front-end of claim 11, wherein the ratio is configured to be adjusted.

13. The RF front-end of claim 12, wherein the ratio is configured to be adjusted based on an insertion loss of the autotransformer between the antenna and the low-noise amplifier.

14. The RF front-end of claim 10, wherein the autotransformer and the balancing network are configured such that a signal provided by the power amplifier at the center node appears common mode to the low noise amplifier at the end node of the primary winding and the end node of the secondary winding.

15. The RF front-end of claim 10, wherein the RF front-end is configured for full-duplex communication.

16. The RF front-end of claim 10, wherein the low-noise amplifier is a noise-matched low-noise amplifier.

17. A radio-frequency (RF) front-end comprising:
    an autotransformer comprising a primary winding and a secondary winding, wherein the primary winding and the secondary winding are coupled in series at a center node;
    an antenna coupled to an end node of the primary winding;
    a balancing network coupled to an end node of the secondary winding;
    a power amplifier coupled to the center node; and
    a noise-matched low-noise amplifier coupled across the end node of the primary winding and the end node of the secondary winding.

18. The RF front-end of claim 17, wherein a resistance of the balancing network is inversely proportional to a ratio of a number of turns of the primary winding to a number of turns of the secondary winding.

19. The RF front-end of claim 18, wherein the ratio is configured to be adjusted.

20. The RF front-end of claim 19, wherein the ratio is configured to be adjusted based on an insertion loss of the autotransformer between the antenna and the noise-matched low-noise amplifier.

\* \* \* \* \*